United States Patent
Yamada et al.

[11] Patent Number: 5,811,667
[45] Date of Patent: Sep. 22, 1998

[54] KNOCK DETERMINATION USING A VARIABLE AVERAGING COEFFICIENT

[75] Inventors: Hirohiko Yamada, Anjo; Hideki Yukumoto, Kariya, both of Japan

[73] Assignee: Nippondenso Co., Ltd., Kariya, Japan

[21] Appl. No.: 672,760

[22] Filed: Jun. 28, 1996

[30] Foreign Application Priority Data

Jul. 24, 1995 [JP] Japan .................................. 7-186712

[51] Int. Cl.$^6$ .............................. G01M 15/00; F02P 5/15
[52] U.S. Cl. .................. 73/116; 73/35.03; 73/35.06; 73/35.09; 364/431.08; 340/439
[58] Field of Search .......................... 73/115, 116, 117.2, 73/117.3, 35.01, 35.03, 35.04, 35.06, 35.09; 364/431.07, 431.08; 340/439; 123/419

[56] References Cited

U.S. PATENT DOCUMENTS

| | | | |
|---|---|---|---|
| 5,095,742 | 3/1992 | James et al. | 73/116 |
| 5,105,372 | 4/1992 | Provost et al. | 73/116 |
| 5,237,862 | 8/1993 | Mangrulkar et al. | 73/116 |
| 5,311,765 | 5/1994 | Iwakiri | 73/116 |
| 5,331,848 | 7/1994 | Nakagawa et al. | 73/116 |
| 5,381,689 | 1/1995 | Ishida | 73/116 |
| 5,515,720 | 5/1996 | Remboski et al. | 73/116 |
| 5,539,644 | 7/1996 | Ichikawa et al. | 73/118.1 |
| 5,542,291 | 8/1996 | James | 73/116 |

FOREIGN PATENT DOCUMENTS

| | | |
|---|---|---|
| A 58-28644 | 2/1983 | Japan . |
| A 60-123746 | 7/1985 | Japan . |
| 6-41151 | 10/1994 | Japan . |

Primary Examiner—George M. Dombroske
Attorney, Agent, or Firm—Nixon & Vanderhye P.C.

[57] ABSTRACT

To ensure both responsiveness and stability of a knock determination in which a knock sensor signal is compared with a knock determining reference computed from a background value, a difference between the knock sensor signal and the background value is determined through averaging by the use of the averaging coefficient. Based on the difference, the averaging coefficient n is varied so that the more latest sensor output signals are used in the background value determination as the difference becomes larger.

10 Claims, 5 Drawing Sheets

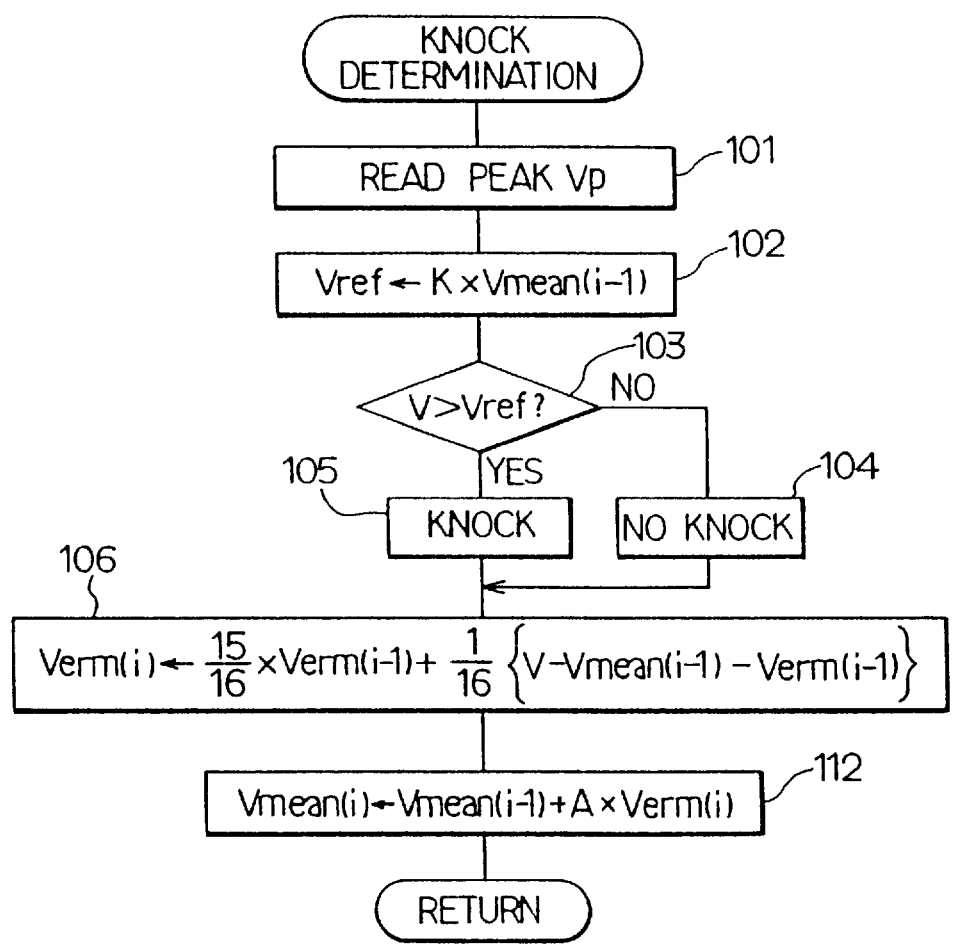

KNOCK DETERMINATION USING A VARIABLE AVERAGING COEFFICIENT

BACKGROUND OF THE INVENTION

1. Field of the Invention

The present invention relates to an apparatus and method for determining occurrence of knock of an internal combustion engine by use of a knock sensor detecting knock-triggered vibrations of the engine.

2. Description of Related Art

Various apparatuses for determining occurrence of engine knocks in internal combustion engines are known and used. One such apparatus, disclosed in Japanese Utility Model Publication (JP-Y2) No. Hei 6-41151, uses averaged output signals from a knock sensor at each ignition event to set a background value. With the background value thus determined as a reference, the apparatus computes a knock determining level. The occurrence of an engine knock is determined by comparing output signals from the knock sensor with the knock determining level. Where knock sensor output signals are averaged at each ignition event to determine the background value, the averaging coefficient by which to weigh the averaging process is reduced in an engine transient operation state. Reducing the averaging coefficient increases that proportion of the most recent knock sensor output signal which is reflected in the background value in the transient state. This enhances precision in determining engine knocks during transient operation.

Thus, the reason for reducing the averaging coefficient in transient operation state is to improve responsiveness of the background value by raising the proportion of the latest knock sensor output signal to be reflected in the background value. In this way sudden changes in the knock sensor output during transient operation are addressed and taken care of. However, according to the recent experiments conducted by the inventors, the following findings are obtained: In some cases, the background value has a level of responsiveness high enough to allow the averaging coefficient to be left intact even in the transient state (i.e., where changes in the knock sensor output are small). In other cases, where the transient state is not very pronounced, sudden changes in the knock sensor output require boosting the responsiveness of the background value.

For example, where the rate of engine load change is determined to represent a transient operation state, the level of responsiveness differs between low and high speed operations. The required level of responsiveness also varies from one internal combustion engine to another. There exists no direct correlation between the transient operation state and the responsiveness of the background value. This means that if the averaging coefficient is always reduced upon detection of the transient state, as in conventional apparatus, the following irregularities can occur: where any increase in responsiveness of the background value is not actually needed, i.e., where changes in the knock sensor output are so small that the background value is required to remain stable, reducing the averaging coefficient can cause the background value to fluctuate and thereby lower precision in determining engine knocks. Conversely, where the responsiveness of the background value needs to be increased, a failure to change the averaging coefficient in time leads to a delay in response causing faulty determination of engine knocks.

SUMMARY OF THE INVENTION

It is therefore an object of the present invention to overcome the above-described deficiencies and disadvantages of the prior art and to provide an internal combustion engine knock determining apparatus capable of changing the averaging coefficient whenever better responsiveness of the background value is actually required. In this way both the responsiveness and the stability of the background value are ensured concurrently, whereby precision in determining engine knocks is improved.

According to the invention, when obtaining a background value by averaging knock sensor output signals at each ignition event, a difference between output signals of a knock sensor at the current ignition event and the background value from the most recent averaging of knock sensor output signals is determined. Then the averaging coefficient is varied in accordance with the difference thus determined. In that case, the difference between the knock sensor output signal and the background value represents a response delay of the background value due to a change in the knock sensor output signal. Thus if the averaging coefficient is varied in accordance with that difference, the coefficient reflects the changes in the knock sensor output signal. It follows that the background value computed by use of the averaging coefficient also reflects the change in the knock sensor output signal.

Preferably, the difference between the knock sensor output signal and the averaging coefficient computed in the previous time is also averaged. Thus, the difference obtained between the knock sensor output signal and the background value is made highly reliable because averaging ensures both stability and responsiveness of the difference.

Preferably, the averaging coefficient is made smaller the greater the difference between the output signal from the knock sensor and the background value obtained from the most recent averaging of knock sensor output signals. Lowering the averaging coefficient increases the proportion of the most recent output signal from the knock sensor so that the sensor signal proportion will be reflected on the background value. This enhances responsiveness of the background value. Where the difference between the knock sensor output signal and the background value is small, i.e, where the change in the knock sensor output signal is small, the averaging coefficient is made relatively large so that the proportion of the most recent knock sensor output signal is reduced and the reduced sensor signal proportion is reflected on the background value. This improves the stability of the background value.

Alternatively, the difference between the output signal of the knock sensor at each ignition event and the background value obtained from the most recent averaging of knock sensor output signals is determined. A value corresponding to the determined difference is added to the background value. In this way the background value is updated. This, as in the case of varying the averaging coefficient, enables the difference between the knock sensor output signal and the background value, i.e., a response delay in the background value due to a change in the knock sensor output signal, to be reflected on the updating of the background value.

BRIEF DESCRIPTION OF THE DRAWINGS

Other features and advantages of the present invention will be made more clear by the following detailed description when read in conjunction with the accompanying drawings, in which:

FIG. 6 is a flowchart illustrating a knock determining routine as part of an internal combustion engine knock determining apparatus practiced as a second embodiment of the invention.

DESCRIPTION OF PRESENTLY PREFERRED EMBODIMENTS

Figure 1:
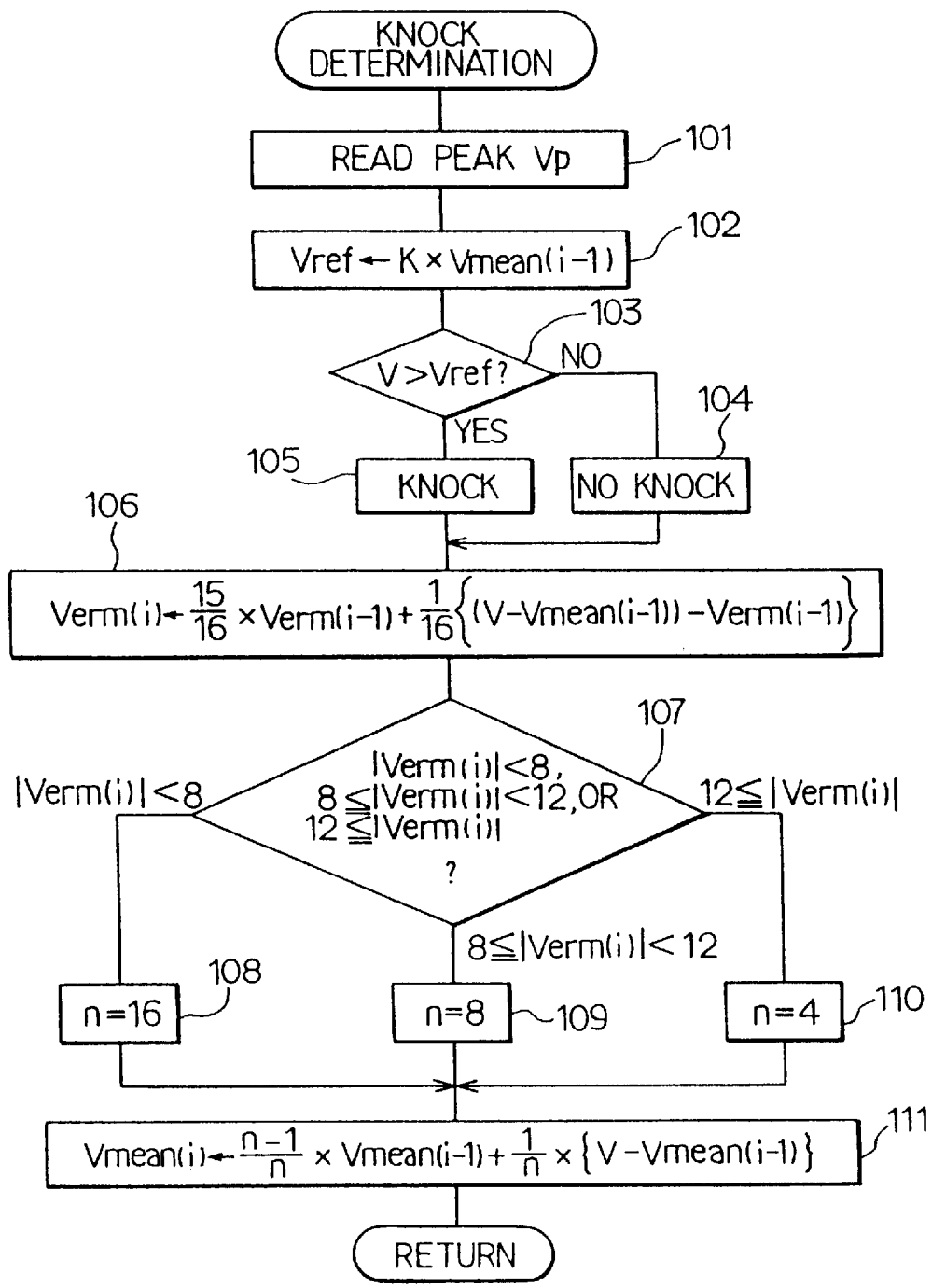
FIG. 1 is a flowchart illustrating a knock determining routine as part of an internal combustion engine knock determining apparatus practiced as a first embodiment of the invention.
Figure 2:
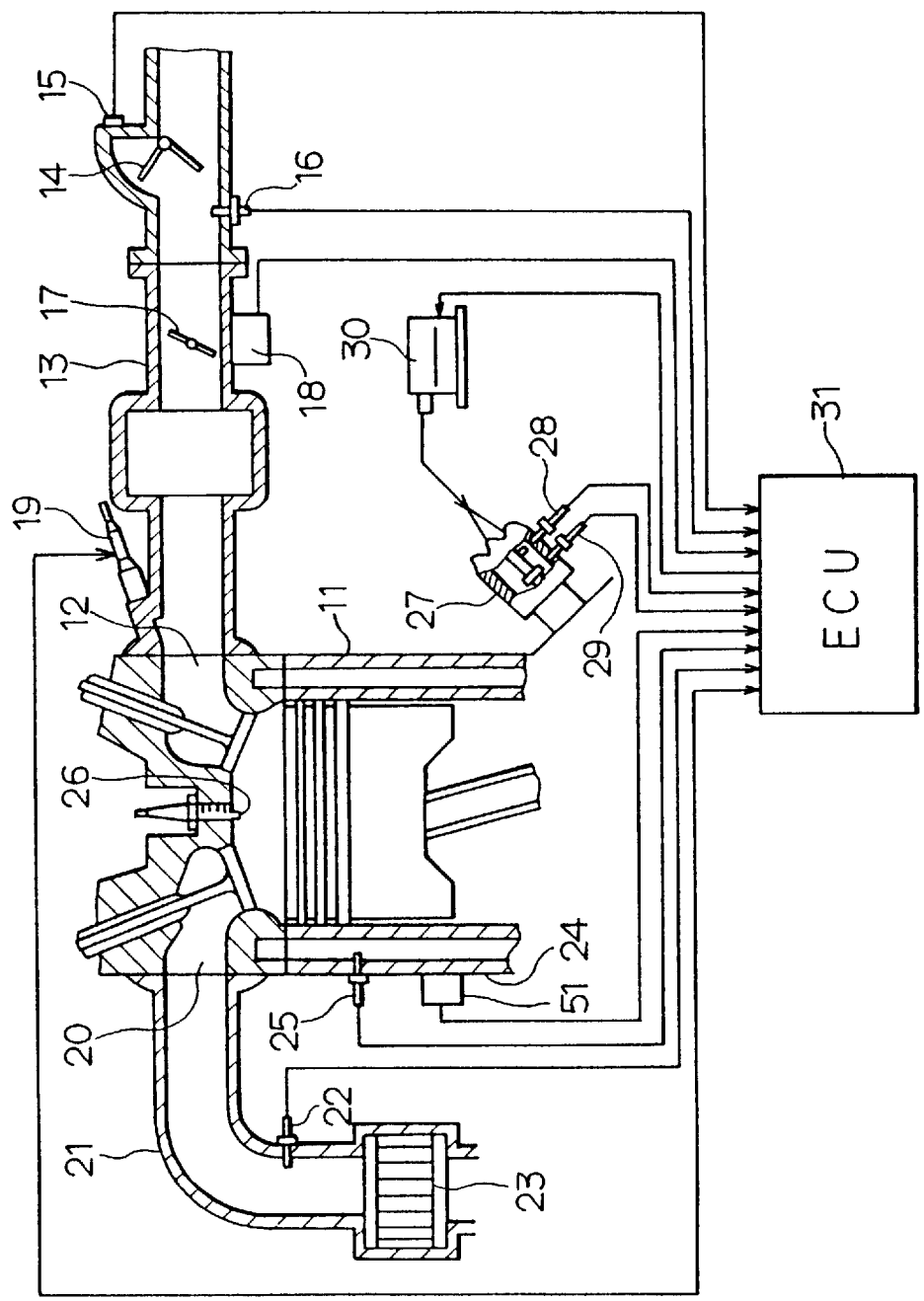
FIG. 2 is an overall schematic view of an engine control system in the first embodiment.
Figure 3:
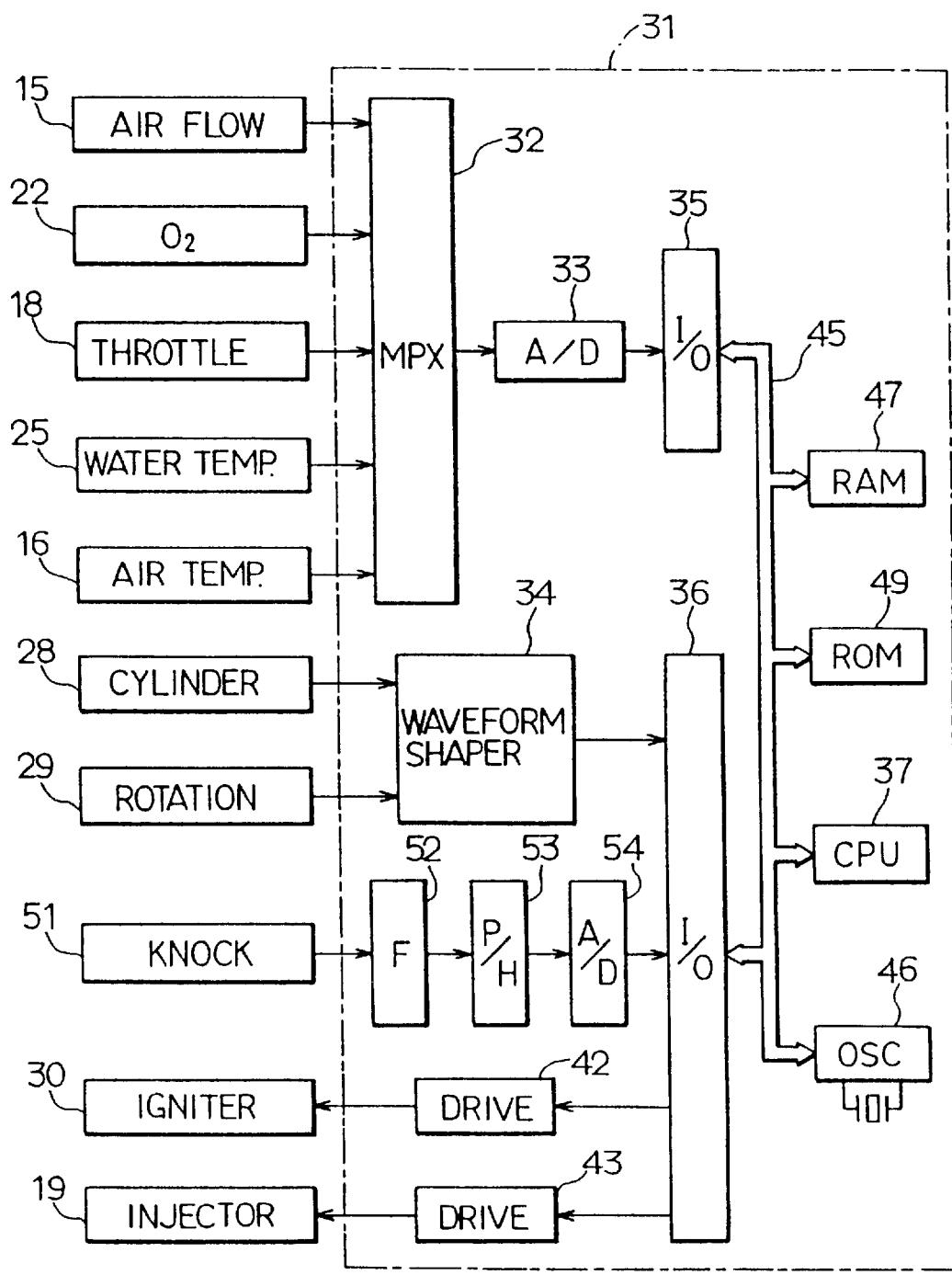
FIG. 3 is a block diagram of a control circuit in the first embodiment.

The first embodiment of the invention will now be described with reference to FIGS. 1 through 5. An engine control system according to the first embodiment is shown in FIGS. 2 and 3. An air flow meter 14 is located upstream of an intake pipe 13 connected to an intake port 12 of an internal combustion engine 11. The amount of intake air measured by the air flow meter 14 is converted by an air flow sensor 15 into a voltage signal for output. Provided downstream of the air flow meter 14 are an intake air temperature sensor 16 for detecting the temperature of intake air and a throttle valve 17. The opening of the throttle valve 17 is detected by a throttle sensor 18. A fuel injection valve 19 is mounted close to each intake port 12.

An $O_2$ (oxygen concentration) sensor 22 for detecting the density of oxygen in exhaust gas and an exhaust gas catalyzer 23 are attached to an exhaust pipe 21 connected to each exhaust port 20 of the engine 11. A cylinder block 24 of the engine 11 is equipped with a knock sensor 51 for detecting the vibration of an engine knock and a water temperature sensor 25 for detecting the temperature of engine cooling water. A distributor 27 for distributing high voltages to an ignition plug 26 of each cylinder in the engine 11 is furnished with cylinder identifying sensors 28 for identifying the crank angle reference position of the respective cylinders and with a rotation angle sensor 29 for outputting pulse signals at frequencies reflecting the engine revolutions. The distributor 27 is supplied with a high voltage from an igniter 30.

As shown in FIG. 3 in detail, an electronic control unit (ECU) 31 for controlling the engine 11 in operation has a multiplexer (MPX) 32 for selecting sensor signals from the air flow sensor 15, $O_2$ sensor 22, throttle sensor 18, water temperature sensor 25 and intake air temperature sensor 16. The selected sensor signals are read through an A/D conversion circuit 33 and an input/output port (I/O) 35. A waveform shaping circuit 34 in the control circuit 31 shapes waveform of sensor signals from the cylinder identifying sensors 28 and rotation angle sensor 29 and causes the shaped sensor signals to be admitted through an input/output (I/O) port 36. With a signal from the knock sensor 51, a filter (F) 52 retrieves from the signal a vibration component of a predetermined frequency bandwidth and forwards the vibration component to a peak hold circuit (P/H) 53. The peak hold circuit 53 holds the peak value from the received vibration component in a knock determining period T (FIG. 5A) between the two successive top dead center position (TDC) for each ignition event (TDC). The peak value is sent to an A/D conversion circuit 54 for analog-to-digital conversion. The digitized peak value is entered through the input/output port (I/O) 36. The sensor signals admitted through the input/output ports 35 and 36 are input via a data bus 45 to a CPU 37 wherein the amount of fuel injection and the ignition timing are computed. Control signals derived from the computations are output through the input/output port 36 to drive circuits 42 and 43 for control over the igniter 30 and fuel injector valve 19.

The control unit 31 includes an oscillator circuit (OSC) 46 that feeds the CPU 37 with a clock signal, a RAM 47 and a ROM 49. The ROM 49 stores various engine control programs such as a fuel injection control program and an ignition timing control program, as well as a program composed of the knock determining routine shown in FIG. 1. Executing the knock determining routine starts a series of steps to determine a background value Vmean by averaging the output signals of the knock sensor 51 at ignition events. At each ignition time, the difference between the knock sensor signal V and the most recently obtained background value Vmean(i−1) is determined through averaging. An averaging coefficient by which to average the background value Vmean(i) is varied according to the difference thus obtained.

More details of the knock determining routine will now be described with reference to the flowchart of FIG. 1. The knock determining routine is repeated at every ignition event. After the routine is started, step 101 first reads the peak value Vp of the knock sensor signal V (FIG. 5B) obtained through the peak hold process in the knock determining period T (FIG. 5A) upon ignition. In step 102, the background value Vmean(i−1) most recently obtained is multiplied by a predetermined coefficient K to compute a knock determining level Vref. In step 103, the knock sensor signal V is compared with the knock determining level Vref. If the knock sensor signal V is found to be lower than the knock determining level Vref, no knock is detected in step 104. If the knock sensor signal V is found to exceed the knock determining level Vref, a knock is detected in step 105.

In step 106, the difference Verm(i) between the knock sensor signal V and the background value Vmean(i−1) most recently obtained is determined through averaging by use of the following equation:

$$Verm(i) = 15 \times Verm(i-1) / 16 + \{(V - Vmean(i-1)) - Verm(i-1)\} / 16$$

where Verm(i−1) is the most recently obtained value Verm. Although the averaging process is performed by 1/16 averaging, this is not limitative. Alternatives may include 1/12 averaging, 1/8 averaging, 1/4 averaging, and any other kind of averaging.

In step 107, a check is made to determine which of the following three ranges the absolute value of Verm(i) computed in step 106 falls into:

(1) |Verm(i)|<8

(2) 8≦|Verm(i)|<12

(3) |Verm(i)|≧12

If the absolute value of Verm(i) is less than 8 (|Verm(i)|<8), step 108 is reached. In step 108, the averaging coefficient n is set to 16 for 1/n-averaging of the background value Vmean(i) with n=16 in this case. If the absolute value of Verm(i) falls between 8 and 12 (8≦|Verm(i)|<12), step 109 is reached. In step 109, the averaging coefficient n is set to 8. If the absolute value of Verm(i) is at least 12 (|Verm(i)|≧12), step 110 is reached. In step 110, the averaging coefficient n is set to 4. In this manner, the greater the difference Verm(i) between the knock sensor signal V and the background value Vmean(i−1) most recently obtained, i.e., the greater the change in the knock sensor signal V, the smaller the averaging coefficient n rendered so as to increase the proportion of the latest knock sensor signal V to be reflected on the background value Vmean(i). This enhances the responsiveness of the background value Vmean(i).

In step 111, the background value Vmean(i) is computed through averaging by use of the averaging coefficient n obtained in steps 108 through 110. The process involved is:

Vmean(i)=(n−1)×Vmean(i−1) / n+{V−Vmean(i−1)} / n.

Figure 4A:
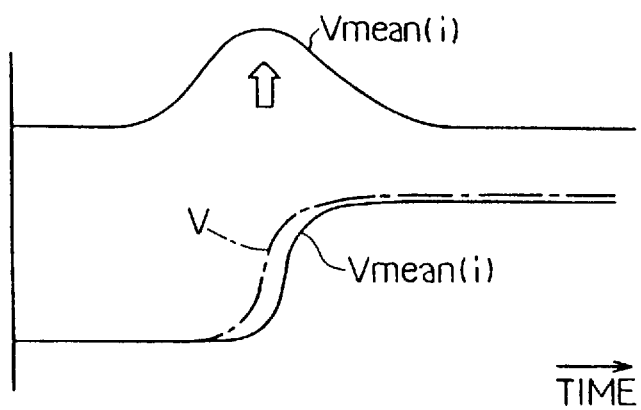
FIGS. 4A and 4B are graphic representations indicating differences between the first embodiment and a conventional apparatus in terms of background value responsiveness.

With the first embodiment described above, the difference Verm(i) between the knock sensor signal V and the background value Vmean(i−1) most recently obtained is determined as data representing the change in the knock sensor signal V. The greater the difference Verm(i) determined, the smaller the averaging coefficient n rendered. Thus the greater the change in the knock sensor signal V, the greater the proportion of the latest knock sensor signal V to be reflected on the background value Vmean(i). This increases the responsiveness of the background value Vmean(i). It follows that, as depicted in FIG. 4A, a sudden, considerable change in the knock sensor signal V is accompanied by the corresponding change in the background value Vmean(i). This minimizes the delay in response and prevents incorrect determination of engine knocks.

Figure 4B:
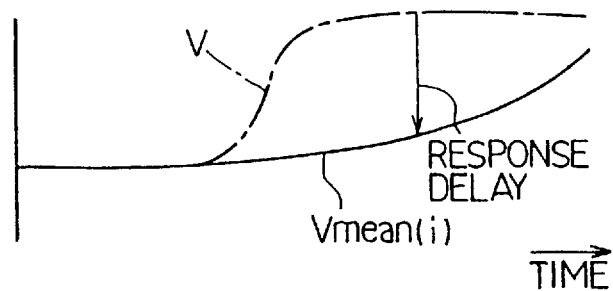
Figure 5A:
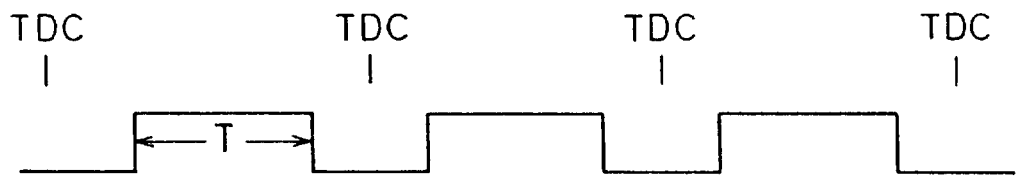
FIGS. 5A and 5B are timing charts showing a typical timing for processing the knock sensor signal.
Figure 5B:
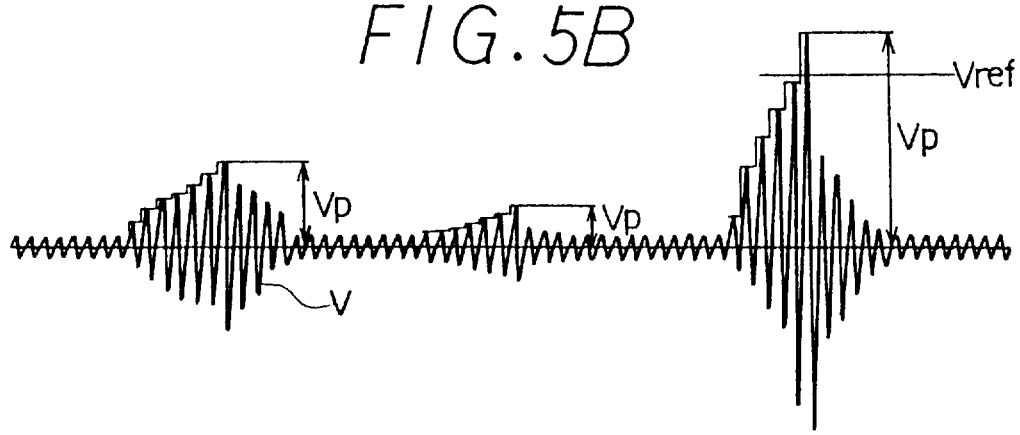

In the conventional process, by contrast, even at growing changes in the knock sensor signal V the averaging coefficient n is kept unmodified. As shown in FIG. 4B, this can let the response delay increase in the background value Vmean(i) and lead to false determination of engine knocks.

With the first embodiment, where the difference Verm(i) between the knock sensor signal V and the background value Vmean(i−1) is small, i.e., where the change in the knock sensor signal V is small, the averaging coefficient n is raised so as to reduce the proportion of the latest knock sensor signal V to be reflected in the background value Vmean(i). This allows the responsiveness of the background value Vmean(i) to be lowered to a certain extent when changes in the knock sensor signal V are small, whereby the stability of the background value is enhanced. With the dispersion of the background value Vmean(i) thus minimized, stable determination of engine knocks is ensured.

With the first embodiment described above, the averaging coefficient n is varied in accordance with the absolute value of the difference Verm(i) between the knock sensor signal V and the background value Vmean(i−1). This is because the response delay in the background value Vmean(i) is considered in both increasing and decreasing directions of the difference Verm(i). Since response delays cause problems only when the difference Verm(i) is on the rise, the averaging coefficient n may be varied not in accordance with the absolute value of Verm(i) but according to the value Verm(i) in the positive direction alone. In that case, the averaging coefficient n is left unchanged when the value Verm(i) is negative.

The first embodiment has its averaging coefficient n varied among three values. An obvious alternative to this is for the averaging coefficient n to be varied between two values or among four or more values in accordance with the positive or absolute value of Verm(i).

Since the difference Verm(i) between the knock sensor signal V and the background value Vmean(i−1) represents a response delay in the value Vmean(i−1) caused by a change in the signal V, a new background value Vmean(i) may be determined by adding a value corresponding to the difference Verm(i) to the most recently obtained background value Vmean(i−1). This is an alternative to the scheme of varying the averaging coefficient n in accordance with the difference Verm(i).

This alternative is implemented as the second embodiment of the invention, described below with reference to the flowchart of FIG. 6. Of the steps in FIG. 6, step 112 replaces steps 107 through 111 of the flowchart in FIG. 1; the other steps are the same between the two flowcharts. Specifically, in FIG. 6, step 106 determines through averaging the difference Verm(i) between the knock sensor signal V and the background value Vmean(i−1) most recently obtained. Step 106 is followed by step 112 in which the difference Verm(i) is multiplied by a constant "A" before being added to the most recently determined background value Vmean(i−1) to obtain a new background value Vmean(i).

As in the case of varying the averaging coefficient n, the second embodiment whereby a value corresponding to the difference Verm(i) is added to the background value Vmean(i−1) makes it possible for the difference Verm(i) between the knock sensor signal V and the background value Vmean(i−1), i.e., a response delay in the background value caused by a change in the knock sensor signal, to be reflected in the updating of the background value. This ensures both responsiveness and stability of the background value, whereby precision in determining engine knocks is improved.

The present invention having been described with reference to the presently preferred embodiments should not be limited thereto but may be modified in many other ways without departing from the spirit and scope of the invention.

What is claimed is:

1. A knock determining apparatus for an internal combustion engine, comprising:

a knock sensor mounted on the engine block for detecting a knock vibration of said internal combustion engine;

background value computing means for determining a background value by averaging with an averaging coefficient output signals from said knock sensor, said background value computing means determining a difference between the output signal of said knock sensor and said background value obtained from a most recent averaging of knock sensor output signals, and changing said averaging coefficient in accordance with said difference so as to update said background value;

knock determining level setting means for setting a knock determining level with reference to said background value; and knock determining means for determining the occurrence of an engine knock by comparing the output signals of said knock sensor with said knock determining level.

2. A knock determining apparatus according to claim 1, wherein:

said background value computing means determines said averaging coefficient in accordance with an averaged difference between the current output signal from said knock sensor and the background value obtained from the most recent averaging of knock sensor output signals.

3. A knock determining apparatus according to claim 2, wherein:

said background value computing means renders said averaging coefficient smaller as the difference between the output signal from said knock sensor and the background value obtained from the most recent averaging of knock sensor output signals is greater, whereby the proportion of the most recent output signal from said knock sensor is increased so that said proportion after the increase will be reflected on said background value.

4. A knock determining apparatus for an internal combustion engine, said apparatus comprising:

a knock sensor for detecting a knock vibration of said internal combustion engine;

background value computing means for determining a background value by averaging with an averaging coefficient output signals from said knock sensor, said background value computing means determining a difference between the output signal of said knock sensor and said background value obtained from a most recent averaging of knock sensor output signals, and changing said averaging coefficient in accordance with said difference so as to update said background value;

knock determining level setting means for setting a knock determining level with reference to said background value; and knock determining means for determining the occurrence of an engine knock by comparing the output signals of said knock sensor with said knock determining level;

said background value computing means rendering said averaging coefficient smaller as the difference between the output signal from said knock sensor and the background value obtained from the most recent averaging of knock sensor output signals is greater, whereby the proportion of the most recent output signal from said knock sensor is increased so that said proportion after the increase will be reflected on said background value.

5. A knock determining apparatus for an internal combustion engine, comprising:

a knock sensor mounted on the engine block for detecting a knock vibration of said internal combustion engine;

background value computing means for determining a background value by averaging output signals from said knock sensor at each ignition event, said background value computing means determining a difference between the output signal of said knock sensor and said background value obtained from the most recent averaging of knock sensor output signals and adding to said background value a value corresponding to said difference, thereby updating said background value;

knock determining level setting means for setting a knock determining level with reference to said background value; and knock determining means for determining the occurrence of an engine knock by comparing the output signals of said knock sensor with said knock determining level.

6. A knock determining method for an internal combustion engine, said method comprising the steps of:

detecting knock vibration of said internal combustion engine by a knock sensor mounted on the engine block;

determining a background value by averaging with an averaging coefficient output signals from said knock sensor, said background value computing step including further steps of (1) determining a difference between the output signal of said knock sensor and said background value obtained from a most recent averaging of knock sensor output signals, and (2) changing said averaging coefficient in accordance with said difference so as to update said background value;

setting a knock determining level with reference to said background value; and determining the occurrence of an engine knock by comparing the output signals of said knock sensor with said knock determining level.

7. A knock determining method for an internal combustion engine, said method comprising the steps of:

detecting a knock vibration of said internal combustion engine by a knock sensor mounted on the engine block;

determining a background value by averaging output signals from said knock sensor, said background value computing step including further steps of (1) determining a difference between the output signal of said knock sensor and said background value obtained from the most recent averaging of knock sensor output signals and (2) adding to said background value a value corresponding to said difference, thereby updating said background value;

setting a knock determining level with reference to said background value; and determining the occurrence of an engine knock by comparing the output signals of said knock sensor with said knock determining level.

8. A knock determining method for an internal combustion engine, said method comprising the steps of:

detecting knock vibration of said internal combustion engine by a knock sensor which produces output signals varying with the magnitude of knock vibrations;

determining a background value by averaging said output signals from said knock sensor, said background value averaging step including further steps of (1) determining a difference between recent one of said output signal of said knock sensor and said background value obtained from a most recent averaging of knock sensor output signals and (2) updating said background value by said recent one of said output signal of said knock sensor and previous one of said background value, the proportion of use of said recent one of said output signal of said knock sensor being increased as said difference increases;

setting a knock determining level with reference to said updated background value; and determining the occurrence of an engine knock by comparing said output signals of said knock sensor with said knock determining level.

9. A method for determining knock in an internal combustion engine by comparing the output of a knock sensor to a reference value representing a weighted average of prior knock sensor outputs, said method comprising the step of:

in response to an increasing magnitude of knock sensor outputs, also increasing the weight of more recent past knock sensor outputs to said reference value.

10. Apparatus for determining knock in an internal combustion engine, said apparatus comprising:

a knock sensor mounted on the engine block and providing successive electrical outputs representative of the magnitude of engine block vibrations; and a computer connected to compare knock sensor outputs with a weighted average of prior knock sensor outputs; said computer including means for increasing the weight of the more recent knock sensor outputs to said weighted average as the magnitude of said knock sensor outputs increases.

* * * * *